FLASH RECOGNITION READING DEVICE WITH COMPARISON MEANS

Filed March 21, 1969 2 Sheets-Sheet 1

INVENTOR

Steven A. Warren

BY

Dressler, Goldsmith, Clement & Gordon

ATTORNEYS

FLASH RECOGNITION READING DEVICE WITH COMPARISON MEANS

Filed March 21, 1969

2 Sheets-Sheet 2

INVENTOR
Steven A. Warren

BY Dressler, Goldsmith, Clement & Gordon
ATTORNEYS

United States Patent Office 3,609,884

Patented Oct. 5, 1971

3,609,884

FLASH RECOGNITION READING DEVICE WITH COMPARISON MEANS

Steven A. Warren, 480 Saunders Road, Lake Forest, Ill. 60045

Filed Mar. 21, 1969, Ser. No. 809,191
Int. Cl. G09b *17/04*
U.S. Cl. 35—35 B 5 Claims

ABSTRACT OF THE DISCLOSURE

A tachistoscopic device for use with a sheet of symbols to be recognized when momentarily exposed. The device includes a frame having a symbol viewing window, and a shutter is movable past the window to momentarily expose the symbol to be viewed. The sheet of symbols preferably includes a plurality of sets of symbols, each set including a symbol to be viewed and an evaluation symbol to be compared therewith. A latching mechanism is provided for releasably retaining the shutter in a comparison position exposing the evaluation symbol of a set of symbols after the viewable symbol has been exposed.

BACKGROUND OF THE INVENTION

The tachistoscopic device of the present invention is an improvement upon the near-point tachistoscope disclosed in Warren et al. Pat. No. 3,358,391. The device of the above-mentioned patent provides a relatively simple means for momentarily exposing or "flashing" symbols for recognition by a person seeking to improve his reading skills by speeding up his rate of recognition of such symbols.

In my pending application Ser. No. 699,633, filed Jan. 22, 1968 now Pat. No. 3,529,364, issued Sept. 22, 1970, an improved tachistoscopic device and flash recognition training system are disclosed wherein the user of the device can mark the sheet of symbols after he compares the symbols with a separate sheet of evaluation symbols. While this improved structure and system has proven to be highly desirable, it is somewhat troublesome to have to use two separate sheets to compare the symbols to be recognized with the evaluation symbols.

SUMMARY OF THE INVENTION

In order to improve the speed and ability of the tachistoscope user to compare the viewed symbol with an evaluation symbol, and to obviate the necessity of using two sheets of symbols as in my pending application Ser. No. 699,633, the present invention includes a single sheet having a novel arrangement of viewable and evaluation symbols thereon which allows the viewable symbols and evaluation symbols to be readily compared and discrepancies therebetween to be noted directly on the sheet. The symbols are arranged in a vertical column on the sheet, and the column includes a plurality of sets of symbols, each set including a viewable symbol to be recognized when momentarily flashed, and an evaluation symbol to later be compared thereto after the viewing symbol is no longer visible. A column of indexing symbols is adjacent the column of sets of symbols, and the indexing symbols are movable into alignment with a further viewing window in the frame of the tachistoscope when the sheet of symbols is indexed. Marking means is provided on the tachistoscope frame adjacent the index symbol viewing window, so that the sheet of symbols can be readily marked when a discrepancy is noted between the viewable symbols and the evaluation symbols.

A latch member is provided on the tachistoscope frame for releasably retaining the shutter member in the cocked or engaged position, and the latch member also includes means for releasably retaining the shutter member in a comparison position wherein the evaluation symbol is exposed. The latch member is preferably constructed to give a different audio signal or a different tactile sensation when the shutter member is in the comparison position and when the shutter member is in the cocked position, so that the tachistoscope user can readily differentiate between these positions. Furthermore, the evaluation symbols preferably have a different color than the viewable symbols, so that the tachistoscope user will readily know which symbol is to be viewed rapidly and which is to be compared with it later when the viewing symbol is no longer visible.

DESCRIPTION OF THE PREFERRED EMBODIMENT

Figure 1:
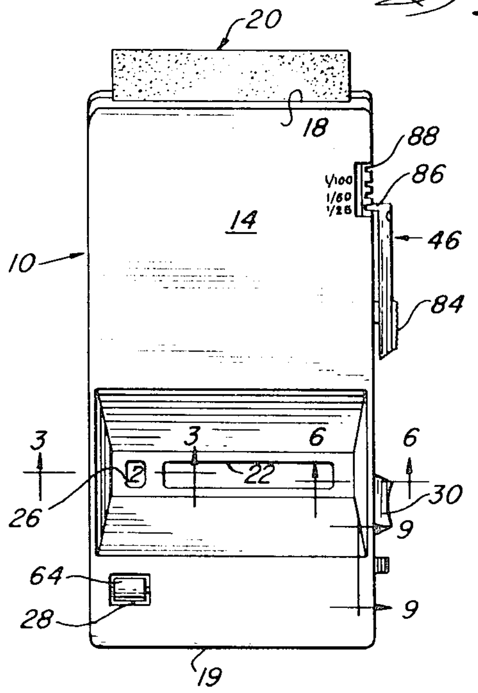
FIG. 1 is a top plan view of a tachistoscope formed in accordance with the present invention.
Figure 2:
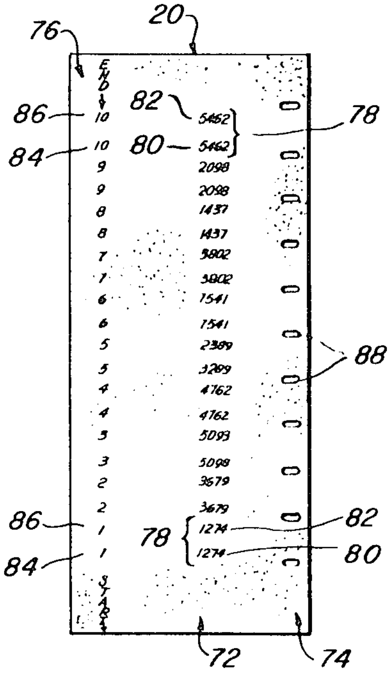
FIG. 2 is a plan view of a sheet of symbols usable with the tachistoscope of FIG. 1.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The tachistoscope of the present invention is illustrated generally at 10 in FIG. 1, and includes an exposure control member in the form of a shutter 12 (FIGS. 4 and 5) which is positioned within a chamber formed by a top container member 14 and a bottom container member 16. Mating members 14 and 16 define an entrance slot 18 at one end of the tachistoscope 10 and an exit slot 19 at the opposite end of the tachistoscope. To use the tachistoscope 10, a sheet of symbols 20 is inserted through slot 18, and pushed into operating position within the tachistoscope. An advancing mechanism to be hereafter described is actuated to sequentially index the sheet 20 through the tachistoscope and out of slot 19.

Near its end opposite slot 18, top container member 14 is provided with a viewing window defined by a generally rectangular aperture 22, through which the user of the tachistoscope may view symbols of sheet 20 when a portion of the sheet is exposed through slot 24 (best seen in FIGS. 4 and 5) in exposure control member 12. Container member 14 is also provided with indexing aperture 26 adjacent viewing aperture 22, with an indexing symbol on sheet 20 being movable into alignment with aperture 26 when a symbol to be viewed and recognized is moved into alignment with aperture 22.

Figures 4, 5, 7:
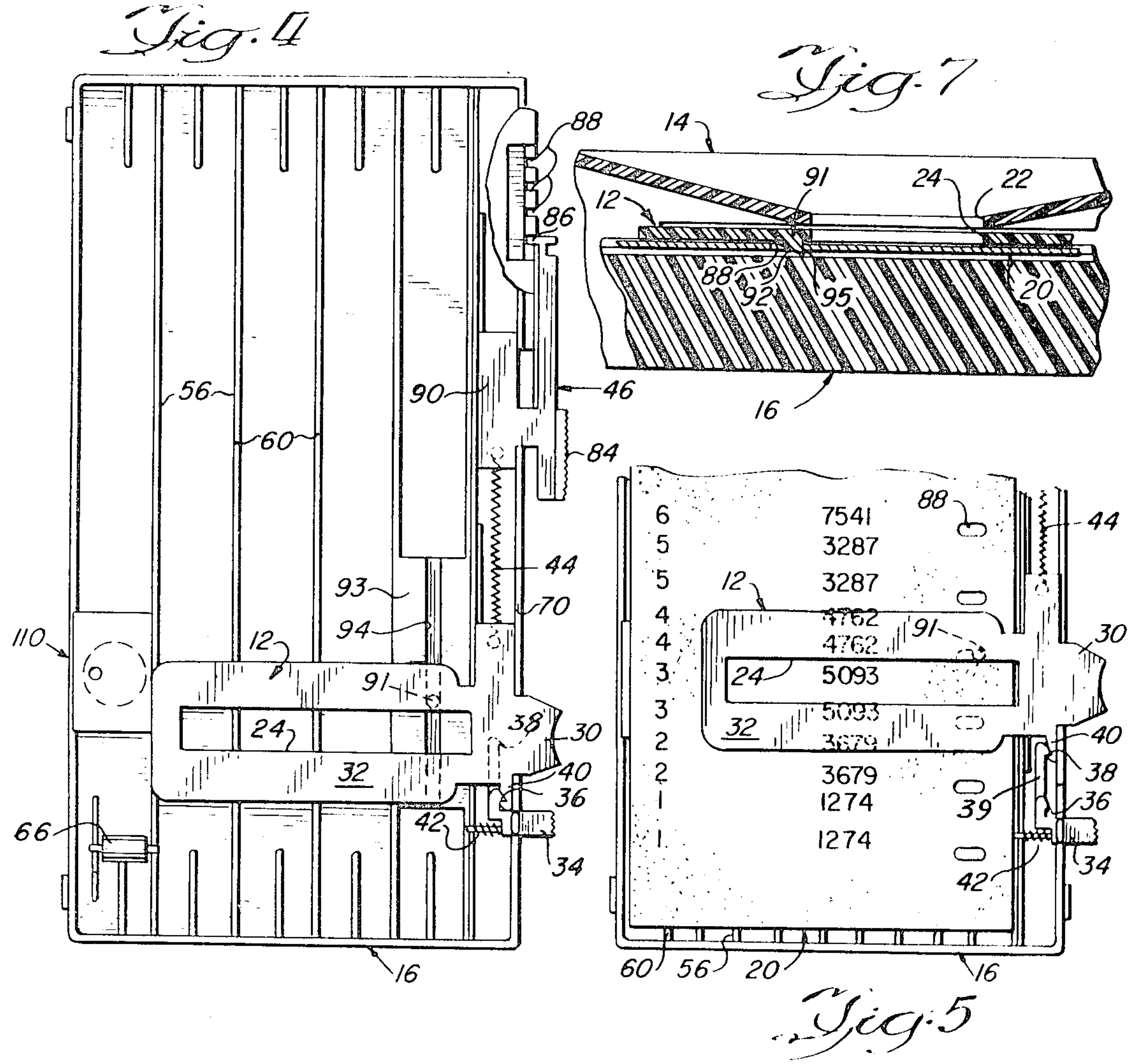
FIG. 4 is an enlarged plan view of the bottom part of the tachistoscope of FIG. 1, with certain parts broken away for clarity of illustration, and with the shutter member in the cocked position.
FIG. 5 is a fragmentary plan view similar to FIG. 4, but with a sheet of symbols in the tachistoscope, and with the shutter member in the comparison position.
FIG. 7 is an enlarged cross sectional view taken along line 7—7 of FIG. 6.
Figure 6:
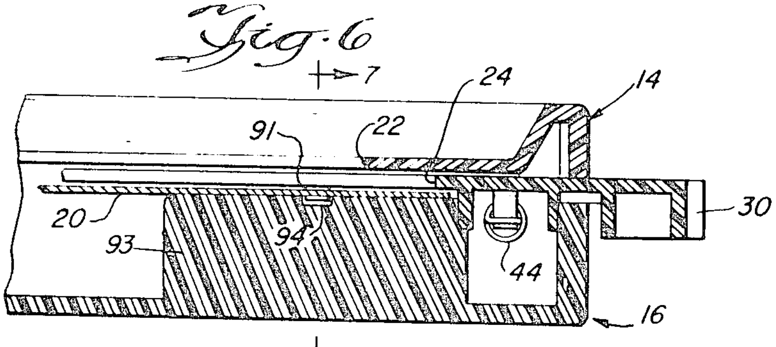
FIG. 6 is an enlarged sectional view taken generally along line 6—6 of FIG. 1.
Figure 8:
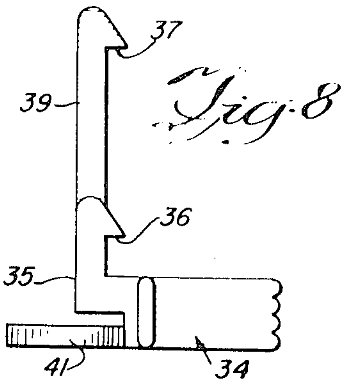
FIG. 8 is an enlarged detail view of the latch member of the present invention.
Figure 9:
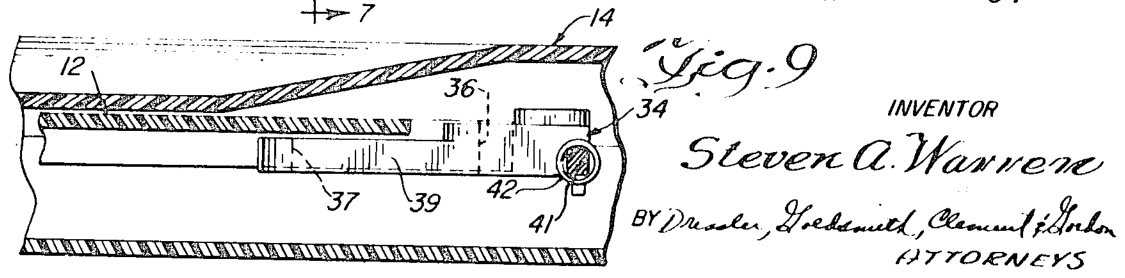
FIG. 9 is a sectional view taken generally along line 9—9 of FIG. 1.

As is best seen in FIGS. 4 and 5, exposure control member 12 consists of movable shield 32 having exposure slot 24 defined therein. It will also be seen from those figures that exposure control member 12 carries finger tab 30, which extends outside the chamber formed by mating container members 14 and 16 to an exposed position that permits the user of the device to move the exposure control member into the cocked position shown in FIG. 5.

Trigger means 34 extends outside the chamber formed by mating container members 14 and 16, and trigger means 34 includes a latch member 35 having a hook 36 thereon for engaging and releasing, as desired, a complementary hook 38 (best seen in FIGS. 4 and 5) at the end of bolt means 40 carried by exposure control member 12. Latch member 35 includes a further hook 37 at the end of a thin, elongate finger 39, and hook 37 is also engageable with hook 38 for releasably retaining the shutter 12 in a comparison position, as will hereinafter appear. Because of the thinness of finger 39, different sounds and a different feel will be created when hooks 36 and 37 are engaged, so that the tachistoscope user can aurally and tactually as well as visually, readily determine the position of the shutter 12.

A coil spring 42 surrounds a stem 41 on latch member 35 and biases the latch member to a position where either hook 36 or hook 37 holds hook 38. The slanted ends of hooks 36, 37 and 38 permit hook 38 to ride over hooks 36 and 37 whenever the user of the tachistoscope presses finger tab 30 downward to the point where the hooks engage each other. Trigger means 34 and its biasing spring 42 cooperate with bolt means 40 on exposure control member 12 to permit the exposure control member to be selectively cocked and released and to permit the exposure control member to be releasably retained in the comparison position.

Tension means 44 is connected at one end to exposure control member 12, and at the other end to a time control mechanism 46. Time control mechanism 46, as is explained in detail in the above-mentioned Warren et al. patent, is employed to govern the time of exposure that is produced when exposure control member 12 is triggered from its cocked condition into its discharge position to cause momentary exposure of symbols on sheet 20 when exposure slot 24 passes through a position of alignment with viewing aperture 22 in top container member 14. As is seen from FIG. 4, the time control mechanism 46 is included within the single chamber formed of the two mating container members 14 and 16, except for an exposed portion 84 that protrudes out of the container for adjustment by the user of the tachistoscope. The time control mechanism includes a main body 90 mounted for sliding movement between the right hand side of member 16 and the rib 56 adjacent thereto, and a protuberance 86 on the time control mechanism may be selectively positioned in any of a plurality of indentations 88 in the outer side wall of top container member 14.

Corresponding parts of mating container members 14 and 16 will be aligned when these two members are assembled in the manner described. Parallel rib members (not shown) in top member 14 will lie above parallel rib members 56 in bottom member 16, with the plane of rib edges being spaced by a distance slightly greater than the thickness of sheet of symbols 20, to provide a space for the movement of said sheet. As seen in FIG. 5, exposure control member 12 helps to confine the sheet of symbols 20 against the upper edges 60 of parallel rib members 56 of bottom mating member 16. The sheet of symbols 20 is also supported upon the upper surface of a support portion 93, formed integrally with bottom member 16 between ribs 56 adjacent the right hand side of exposure control member 12. Support portion 93 has an elongate groove 94 in the upper surface thereof, for a purpose to hereinafter appear.

The sheet of symbols 20 includes a generally centrally disposed column 72 of sets of symbols, a column 74 adjacent the right hand edge of the sheet of means enabling the sheet to be indexed through the tachistoscope 10, and a column 76 of indexing symbols adjacent the left hand edge of the sheet. The column 72 includes a plurality of sets 78 of symbols, each set including a viewable symbol 80 to be recognized when exposed and an evaluation symbol 82 to be compared with the viewable symbol. The symbols 80 and 82 preferably have different colors, so that the user of the tachistoscope can readily distinguish between them, and in an exemplary embodiment, the viewable symbols are black while the evaluation symbols are red. The column of indexing symbols includes a pair of identification symbols 84 and 86 for each set of symbols 78, which are movable into alignment with aperture 26 to indicate the index position of the sheet 20 to the user of the tachistoscope. The column 76 also preferably includes "start" and "stop" indicia at the lower and upper ends thereof, respectively, for advising the user of the tachistoscope of the position of the sheet 20 relative to the tachistoscope frame. The means enabling the sheet 20 to be indexed relative to the tachistoscope includes a plurality of spaced openings 88 that are adapted to be engaged by means associated with exposure control member 12.

As can be seen in FIG. 7, exposure control member 12 is provided with abutment means in the form of a pin 91 extending downwardly therefrom. Pin 91 includes an upwardly inclined side 92 and a vertical side 95. As is evident from FIG. 5, pin 91 is positioned in alignment with the row of openings 88 when the sheet 20 is positioned within the tachistoscope 10. The pin 91 is also positioned in alignment with the slot 94 in support structure 93, and sufficient clearance is provided between the lower end of pin 91 and slot 94 to allow the exposure control member 12 to move freely with respect to the bottom frame member 16. When the sheet 20 is initially placed in the tachistoscope, because of the inclined surface 92 on pin 91, the sheet can be moved past the pin without tearing. When the "start" indicia of column 76 is visible through aperture 26, the pin 91 is received within the first opening 88 and when the exposure control member 12 is moved downwardly into the cocked position (FIG. 4), the upright surface 95 of the pin engages against the edge of the opening to index the sheet 20 to a position wherein the viewable symbol 80 of the first set of symbols is aligned with the aperture 22, and the first indexing symbol 84 is aligned with aperture 26.

Figure 3:
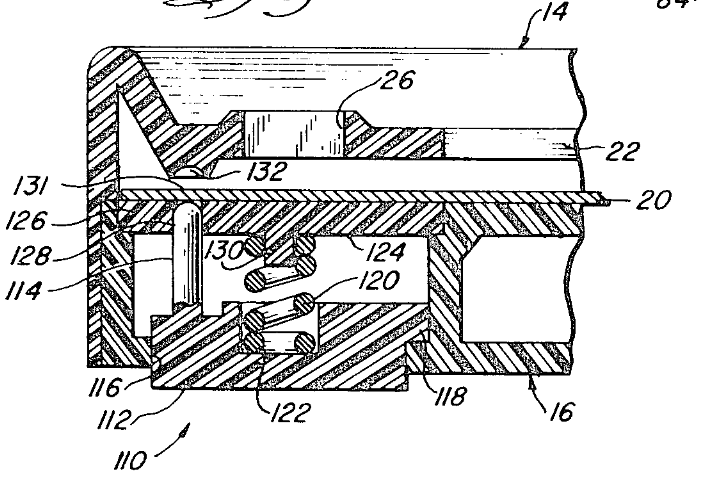
FIG. 3 is an enlarged sectional view taken along line 3—3 of FIG. 1.

When the trigger 34 is pushed inwardly to disengage hooks 36 and 38, spring 44 moves the exposure control member upwardly at a rate determined by the setting of the time control mechanism 46. The finger tab 30 of exposure control member 12 rides in a slot defined by upright edges 70 in the side wall of bottom frame member 16, and the upward movement of the exposure control member is limited by engagement of the finger tab 30 with the upper edge 70, which locates the pin 91 in alignment with the second opening 88. As the slot 24 in the exposure control member 12 moves past the viewable symbol 80, the symbol is momentarily exposed through aperture 22 for recognition by the tachistoscope user. After the symbol 80 has been exposed, the exposure control member 12 is pulled downwardly against the bias of spring 44 to shift sheet 20 downwardly and to engage the hook 37 on the trigger 34 with the hook 38 (FIG. 5). This locates the slot 24 in the exposure control member in a position exposing the evaluation symbol 82 through the aperture 22, so that the symbols 80 and 82 can be compared. During movement of the exposure control member 12 from the released position to the comparison position, the portion of the upper member 14 below aperture 22 covers the previously exposed symbol 80 while the portion of member 12 above aperture 24 covers the symbol 80 to be subsequently exposed. When the evaluation symbol 82 is exposed, if the user of the tachistoscope thinks that the viewable symbol was the same as the evaluation symbol, the exposure control member 12 is moved from the comparison position of FIG. 5 to the cocked position of FIG. 4, and this latter movement brings the second viewable symbol into registry with the aperture 22. If the user of the tachistoscope thinks that there is a discrepancy between the symbols 80 and 82, sheet marking means 110 (FIG. 3) is actuated to mark the sheet 20.

The marking device 110 includes a push button 112 having a pin 114 fastened thereto. The push button 112 rides within a slot 116 defined by the lower housing member 16, and has an extension 118 for stopping the outward movement of the push button in response to the bias of a spring 120. Spring 120 is connected between a wall 122 of the push button and a wall 124 of an insert 126. The insert 126 defines a slot 128 (see FIG. 3) through which the pin 114 passes and also has a projection 130 about which the spring 120 is positioned.

When viewing sheet 20 is inserted into the device and the push button 112 is pressed by the operator, the pin 114 will force an area 131 of the viewing sheet against a wall 132, causing a permanent indentation to occur in the area 131 of the sheet 20. Alternatively, the pin 114 may have a sharpened end portion to form an opening in the sheet 20. In this manner, the operator can record his comparison between the symbols 80 and 82 directly on the viewing sheet 20 and a separate sheet is not necessary. The above procedure is repeated until all of the sets 78 have been viewed and compared, and the "end" indicia moves into registration with aperture 26. The sheet 20 is then indexed once more, and removed from the tachistoscope through slot 19. During the above process, the engagement between the upright abutment surface 95 on the pin 91 prevents upward movement of the sheet 20 and cheating by the tachistoscope user.

As an alternative or supplementary sheet advancing means, a rubber roller 64 may be rotatably mounted in an aperture 28 adjacent the lower left hand end of the top member 14, with the roller 64 being positioned in sheet feeding relationship with a roller 66 carried by bottom member 16. Rollers 64 and 66 are arranged to provide a sufficient pressure between them that sheet 20 will be reliably advanced whenever roller 64 is rotated by the user. The pressure between the rollers also provides a braking effect that will hold sheet 20 in the position selected by the user of the tachistoscope until roller 64 is actuated again. The drag created by rollers 64 and 66 is not sufficient to impede the normal indexing movement of sheet 20 by pin 91.

What is claimed is:

1. For use with a sheet having a plurality of sets of symbols, each set including a viewable symbol to be recognized when momentarily exposed and a corresponding evaluation symbol to be compared with said viewable symbol after it has been exposed, a tachistoscope comprising: a frame having a slot for receiving a sheet of viewable and evaluation symbols and a window for viewing the symbols; means for moving each viewable symbol of a set into registry with said window while concealing the corresponding evaluation symbol; a shutter mechanism including an exposure control member mounted for movement relative to said frame between an engaged position and a released position wherein said symbols are covered, said exposure control member having an exposure slot therein movable across said window upon movement of said exposure control member from said engaged position to said released position for momentarily exposing a viewable symbol; means for releasably retaining said exposure control member in said engaged position; means for moving said exposure control member from said engaged position to said released position when said retaining means is released; means for moving said corresponding evaluation symbol into registry with said window; and selectively engageable means for releasably retaining said exposure control member in a comparison position wherein said evaluation symbol is exposed through the slot in the exposure control member, so that a ready comparison can be made between the viewable symbol and evaluation symbol of each set of symbols.

2. A tachistoscope as set forth in claim 1 in which said means for releasably retaining said exposure control member in the comparison position is defined by a latch member, and cooperating hook means on said latch member and said exposure control member.

3. A tachistoscope as set forth in claim 2 wherein the means for releasably retaining the exposure control member in the engaged position is defined by the hook means on said exposure control member and a further hook means on said latch member.

4. A tachistoscope as set forth in claim 3 wherein the hook means on said latch member are shaped to give a different audio signal when they are engaged with the hook means on said exposure control member.

5. A tachistoscope as set forth in claim 3 wherein the hook means on said latch member are shaped to give a different tactile sensation when they are engaged with the hook means on said exposure control member.

References Cited

UNITED STATES PATENTS

| | | | |
|---|---|---|---|
| 2,169,266 | 8/1939 | Matter | 35—9 |
| 2,394,711 | 2/1946 | Miesegaes | 35—9 |
| 2,647,329 | 8/1953 | Bloch et al. | 35—35.2 |
| 3,152,403 | 10/1964 | Betz | 35—9 |
| 3,482,332 | 12/1969 | Hvale et al. | 35—35.2 |

WILLIAM H. GRIEB, Primary Examiner